(12) United States Patent
Yepez et al.

(10) Patent No.: US 9,743,648 B1
(45) Date of Patent: Aug. 29, 2017

(54) BARBLESS SAFETY FISHHOOK

(71) Applicants: Richard Yepez, Deerfield Beach, FL (US); Nestor Guevara, Deerfield Beach, FL (US)

(72) Inventors: Richard Yepez, Deerfield Beach, FL (US); Nestor Guevara, Deerfield Beach, FL (US)

( * ) Notice: Subject to any disclaimer, the term of this patent is extended or adjusted under 35 U.S.C. 154(b) by 217 days.

(21) Appl. No.: 14/729,134

(22) Filed: Jun. 3, 2015

(51) Int. Cl.
*A01K 83/00* (2006.01)
*A01K 83/06* (2006.01)
*A01K 91/047* (2006.01)

(52) U.S. Cl.
CPC .............. *A01K 83/00* (2013.01); *A01K 83/06* (2013.01); *A01K 91/047* (2013.01)

(58) Field of Classification Search
CPC ................................ A01K 83/00; A01K 83/06
USPC ................ 43/43.16, 44.2, 44.8, 15; D22/144
See application file for complete search history.

(56) References Cited

U.S. PATENT DOCUMENTS

| | | | | |
|---|---|---|---|---|
| 13,649 A * | 10/1855 | Johnson | ................. | A01K 79/02 43/4.5 |
| 627,179 A * | 6/1899 | Dreese | ................... | A01K 83/00 43/43.16 |
| 675,321 A * | 5/1901 | Brownfield | ............ | A01K 83/00 43/43.16 |
| 745,066 A * | 11/1903 | Koch | ...................... | A01K 85/00 43/44.8 |
| 749,852 A * | 1/1904 | Dunn | ....................... | F16B 45/06 43/43.16 |
| 775,727 A * | 11/1904 | Koch | ..................... | A01K 91/08 43/44.81 |
| 1,250,053 A * | 12/1917 | Tukey | .................... | A01K 91/06 43/42.72 |
| 2,233,863 A * | 3/1941 | Driscoll | ................. | A01K 83/00 43/43.16 |
| 2,242,708 A * | 5/1941 | Lancaster | ............. | A01K 85/08 43/43.16 |
| 2,266,725 A * | 12/1941 | Andrews | ................ | A01K 83/06 43/43.16 |
| 2,513,256 A * | 6/1950 | Sonnenburg | ............ | F16B 45/00 43/43.16 |
| 2,540,276 A * | 2/1951 | Moler | .................... | A01K 83/00 43/44.2 |
| 2,559,537 A * | 7/1951 | Haynie | .................. | A01K 91/10 43/15 |
| 2,564,216 A * | 8/1951 | Stark | ...................... | A01K 83/06 43/43.16 |
| 2,616,203 A * | 11/1952 | Sarakas | .................. | A01K 97/24 43/42.72 |

(Continued)

FOREIGN PATENT DOCUMENTS

CH   WO 2008052368 A1 *   5/2008   ............. A01K 83/00
DE   EP 1275299 A1 *   1/2003   ............. A01K 83/06

(Continued)

*Primary Examiner* — Darren W Ark

(57) ABSTRACT

The barbless safety fishhook is a fishhook that is designed to keep a fish on the fishhook without the use of a barb. The barbless safety fishhook uses constant tension maintained on the fishing line to move the captured fish to a V shaped valley where the fish is secured. In addition, the barbless safety fishhook is fitted with three rubber brakes that prevent the fish from sliding towards the fishhook tip after capture. The barbless safety fishhook comprises a hook and a spring lock.

4 Claims, 3 Drawing Sheets

(56) References Cited

U.S. PATENT DOCUMENTS

| | | | | |
|---|---|---|---|---|
| 2,750,704 A * | 6/1956 | Bemis | A01K 83/00 | 43/43.16 |
| 2,841,914 A * | 7/1958 | Butler | A01K 83/00 | 43/43.16 |
| 2,861,383 A * | 11/1958 | Gray | A01K 97/18 | 43/43.16 |
| 2,864,198 A * | 12/1958 | Edwards | A01K 83/02 | 43/37 |
| 3,011,284 A * | 12/1961 | Sawyer | A01K 91/04 | 43/42.72 |
| 3,034,250 A * | 5/1962 | Laba | A01K 83/06 | 43/44.8 |
| 3,130,514 A * | 4/1964 | Cornick | A01K 83/00 | 43/43.16 |
| 3,399,483 A * | 9/1968 | Naffziger | A01K 83/06 | 43/44.8 |
| 3,405,477 A * | 10/1968 | Polsfut | A01K 83/06 | 43/44.6 |
| 3,738,048 A * | 6/1973 | Duchscher | A01K 83/06 | 43/44.8 |
| 3,863,383 A * | 2/1975 | Lore | A01K 83/06 | 43/44.8 |
| D242,919 S * | 1/1977 | Petersen, Jr. | D22/144 | |
| 4,023,301 A * | 5/1977 | Warner | A01K 85/08 | 43/43.16 |
| 4,028,838 A * | 6/1977 | Flower | A01K 83/00 | 43/43.16 |
| 4,232,470 A * | 11/1980 | Steffick, Jr. | A01K 83/00 | 43/43.16 |
| 4,514,926 A * | 5/1985 | Weber, Sr. | A01K 85/00 | 43/42.72 |
| 4,524,537 A * | 6/1985 | Malchert, Sr. | A01K 83/02 | 43/36 |
| 4,570,373 A * | 2/1986 | Brief | A01K 83/00 | 43/43.16 |
| 4,750,291 A * | 6/1988 | Chilton | A01K 83/00 | 43/44.82 |
| 4,848,020 A * | 7/1989 | Lash | A01K 97/24 | 43/42.72 |
| 4,905,402 A * | 3/1990 | Clark | A01K 83/00 | 43/43.16 |
| 4,953,321 A * | 9/1990 | Furuta | A01K 83/00 | 43/43.16 |
| 4,982,524 A * | 1/1991 | Vissing | A01K 97/24 | 43/42.72 |
| 5,097,622 A * | 3/1992 | James | A01K 83/00 | 43/43.16 |
| 5,220,743 A * | 6/1993 | McClellan | A01K 85/00 | 43/44.81 |
| D371,594 S * | 7/1996 | Drapak | D22/144 | |
| 5,685,108 A * | 11/1997 | Lepage | A01K 83/00 | 43/43.16 |
| 5,809,687 A * | 9/1998 | Rosenberg | A01K 91/04 | 43/44.83 |
| 5,855,089 A * | 1/1999 | Hockmeyer | A01K 85/00 | 43/43.6 |
| 6,006,467 A * | 12/1999 | Ulrich | A01K 83/00 | 43/43.16 |
| 6,073,385 A * | 6/2000 | Sano | A01K 83/00 | 43/43.16 |
| 6,189,257 B1 * | 2/2001 | Ulrich | A01K 83/00 | 43/43.16 |
| 6,237,277 B1 * | 5/2001 | Hildman | A01K 83/00 | 43/43.16 |
| 6,289,628 B1 * | 9/2001 | Perez | A01K 83/00 | 43/43.16 |
| 6,357,168 B1 * | 3/2002 | Leu | A01K 83/00 | 43/43.16 |
| 6,481,149 B1 * | 11/2002 | Hall, IV | A01K 83/00 | 43/43.16 |
| D469,502 S * | 1/2003 | Shelton | D22/144 | |
| 6,519,895 B1 * | 2/2003 | Bennett | A01K 85/00 | 43/43.16 |
| 6,691,449 B1 * | 2/2004 | Hoben | A01K 83/00 | 43/43.16 |
| 6,779,295 B2 * | 8/2004 | Davidson | A01K 83/00 | 43/43.16 |
| 6,895,711 B1 * | 5/2005 | Nakamichi | A01K 83/06 | 43/42.24 |
| D519,599 S * | 4/2006 | Smith | D22/144 | |
| D540,420 S * | 4/2007 | Stanley | D22/144 | |
| D540,421 S * | 4/2007 | Stanley | D22/144 | |
| 7,225,582 B2 * | 6/2007 | Shay | A01K 83/04 | 43/43.16 |
| 7,481,019 B2 * | 1/2009 | Rosenberg | A01K 83/06 | 43/44.8 |
| 7,490,432 B2 * | 2/2009 | Gillihan | A01K 83/06 | 43/44.8 |
| 7,581,348 B2 * | 9/2009 | Taylor | A01K 83/00 | 43/43.16 |
| 7,788,844 B1 * | 9/2010 | Ruzicka | A01K 91/04 | 43/57.1 |
| 7,841,127 B1 * | 11/2010 | Nakamichi | A01K 83/00 | 43/44.8 |
| 7,980,021 B2 * | 7/2011 | Siatkowski | A01K 83/06 | 43/44.8 |
| 8,087,200 B1 * | 1/2012 | Ferriss | A01K 83/00 | 43/44.8 |
| 8,197,615 B2 * | 6/2012 | Ogawa | A01K 83/00 | 43/43.16 |
| 8,201,358 B2 * | 6/2012 | Dohi | A01K 83/00 | 43/43.16 |
| 8,635,805 B1 * | 1/2014 | Schmunk | A01K 83/06 | 43/44.8 |
| 8,910,416 B2 * | 12/2014 | Bennis | A01K 83/00 | 43/43.16 |
| 9,504,237 B2 * | 11/2016 | Culver | A01K 85/00 | |
| 9,572,329 B2 * | 2/2017 | Hopkins | A01K 83/00 | |
| 2002/0148156 A1 * | 10/2002 | Damm | A01K 83/00 | 43/43.16 |
| 2004/0200127 A1 * | 10/2004 | Ivarson | A01K 83/00 | 43/43.16 |
| 2008/0047192 A1 * | 2/2008 | Bennis | A01K 83/00 | 43/44.8 |
| 2009/0119972 A1 * | 5/2009 | Reilly | A01K 83/00 | 43/43.16 |
| 2010/0088946 A1 * | 4/2010 | Casutt | A01K 83/00 | 43/43.16 |
| 2010/0325938 A1 * | 12/2010 | Gillihan | A01K 83/00 | 43/44.4 |
| 2011/0056115 A1 * | 3/2011 | Sebile | A01K 83/00 | 43/44.81 |
| 2011/0289817 A1 * | 12/2011 | Lorimer | A01K 83/00 | 43/43.16 |
| 2013/0239459 A1 * | 9/2013 | Rosenberg | A01K 83/06 | 43/44.2 |
| 2016/0113255 A1 * | 4/2016 | Mason, Jr. | A01K 83/06 | 43/44.8 |
| 2016/0302399 A1 * | 10/2016 | Sakellaropoulos | A01K 83/06 | |

FOREIGN PATENT DOCUMENTS

| | | | | |
|---|---|---|---|---|
| GB | 2095521 A * | 10/1982 | | A01K 83/00 |
| GB | 2281684 A * | 3/1995 | | A01K 83/00 |
| GB | WO 9704648 A1 * | 2/1997 | | A01K 83/00 |
| GB | 2402857 A * | 12/2004 | | A01K 83/00 |
| JP | 02203728 A * | 8/1990 | | A01K 83/00 |
| JP | 04166031 A * | 6/1992 | | |
| JP | 06022668 A * | 2/1994 | | |
| JP | 06269236 A * | 9/1994 | | |
| JP | 07000082 A * | 1/1995 | | |
| JP | 07203809 A * | 8/1995 | | |
| JP | 08266197 A * | 10/1996 | | |
| JP | 11018625 A * | 1/1999 | | |
| JP | 11164634 A * | 6/1999 | | |
| JP | 2000342111 A * | 12/2000 | | |
| JP | 2001054340 A * | 2/2001 | | |

(56) References Cited

FOREIGN PATENT DOCUMENTS

| | | | | |
|---|---|---|---|---|
| JP | 2001128591 A | * | 5/2001 | |
| JP | 2001161239 A | * | 6/2001 | |
| JP | 2001245555 A | * | 9/2001 | |
| JP | 2002000127 A | * | 1/2002 | |
| JP | 2002209475 A | * | 7/2002 | |
| JP | 2002360123 A | * | 12/2002 | |
| JP | 2003102337 A | * | 4/2003 | |
| JP | 2003189760 A | * | 7/2003 | |
| JP | 2004129645 A | * | 4/2004 | |
| JP | 2005137374 A | * | 6/2005 | |
| JP | 2006129858 A | * | 5/2006 | |
| JP | 2007097535 A | * | 4/2007 | |
| JP | 2007151525 A | * | 6/2007 | |
| JP | EP 2204090 A1 | * | 7/2010 | ............. A01K 83/00 |
| JP | 2012244955 A | * | 12/2012 | |
| WO | WO 9807312 A1 | * | 2/1998 | ............. A01K 83/06 |

* cited by examiner

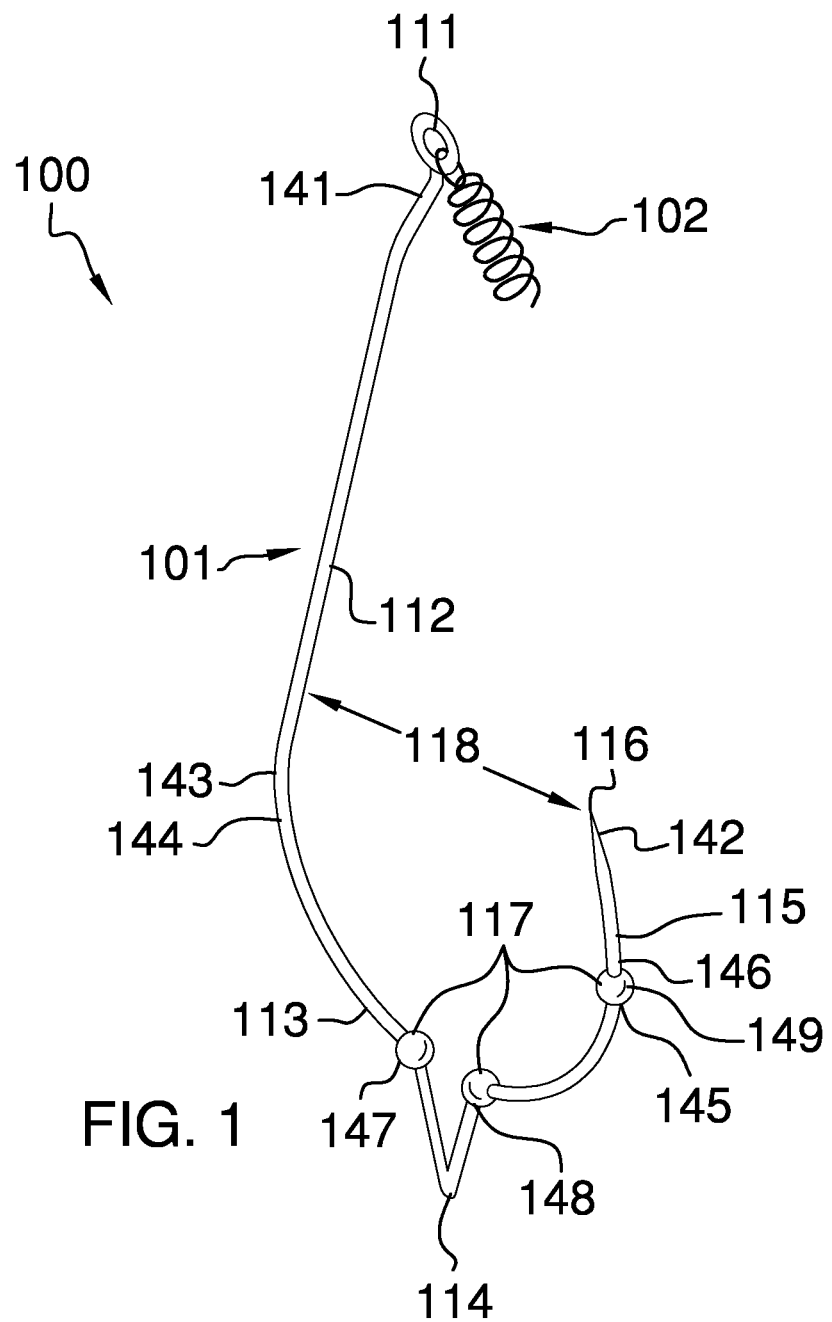

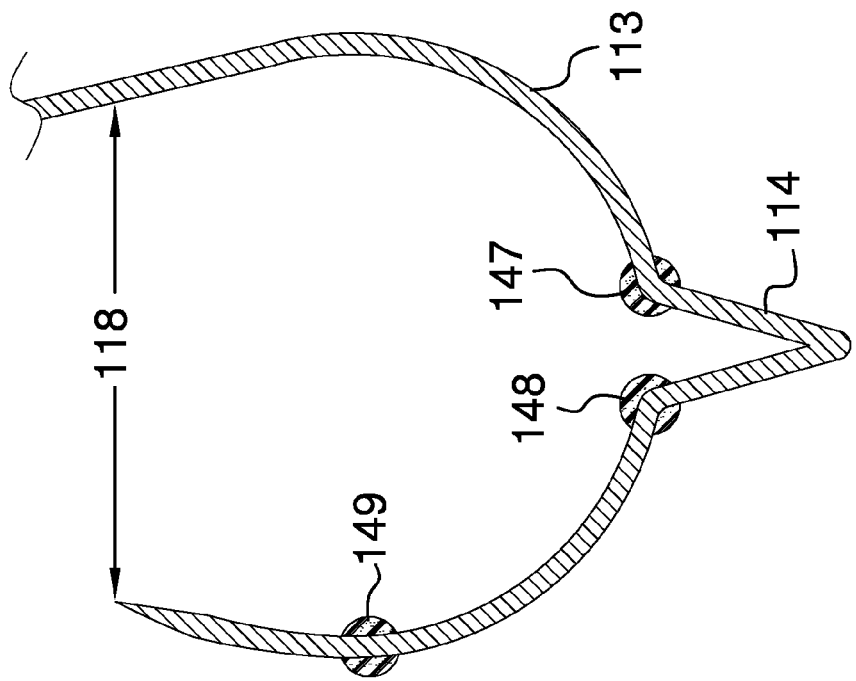
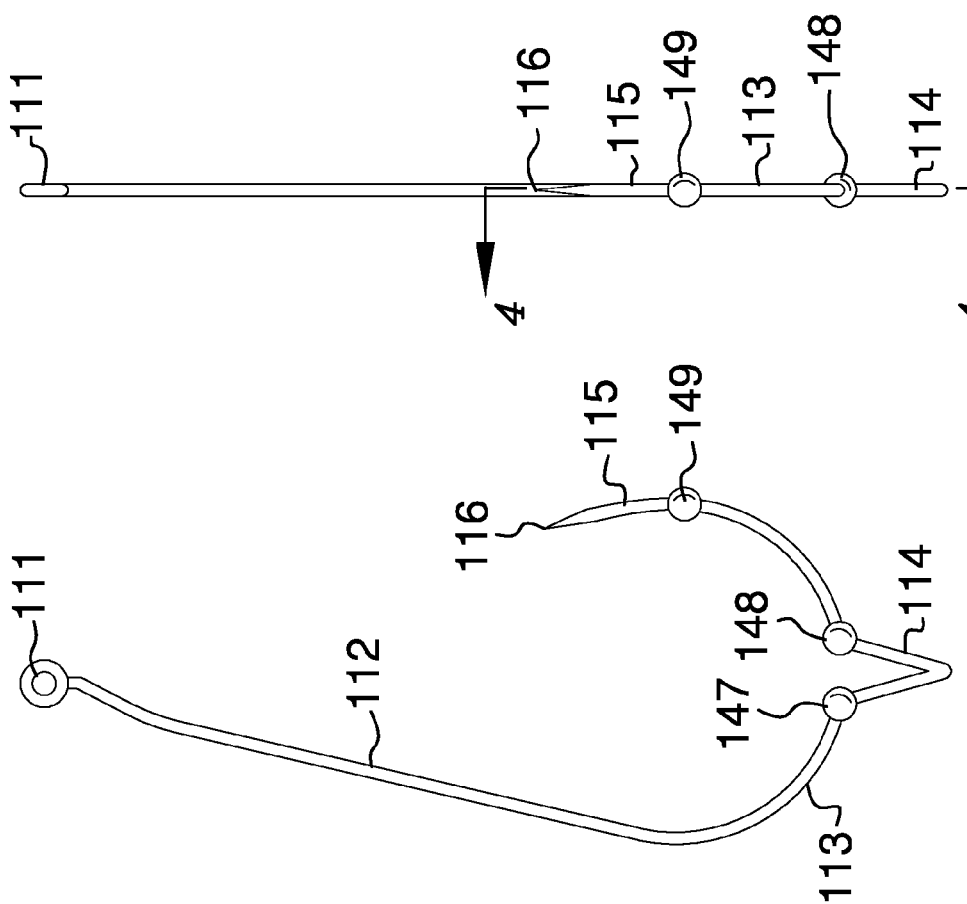

BARBLESS SAFETY FISHHOOK

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of fishhooks, more specifically, a barbless safety fishhook.

Since the first invention of the fishing hook, the barb has been utilized to prevent fish from sliding off the hook. However, even under catch and release circumstances, the barb itself causes a great deal of tissue damage and physical damage to the fish. This is especially true when the fish swallows the hook. In this circumstance, the barb can dramatically injure the fish by causing excessive bleeding, damage to internal organs, and infections. This points to a need to for a fishhook that can secure a fish on the hook without the use of a barb.

SUMMARY OF INVENTION

The above illustrates the need to for a fishhook that can secure a fish on the hook without the use of a barb.

The barbless safety fishhook is a fishhook that is designed to keep a fish on the fishhook without the use of a barb. The barbless safety fishhook uses constant tension maintained on the fishing line to move the captured fish to a V shaped valley where the fish is secured. In addition, the barbless safety fishhook is fitted with three rubber brakes that prevent the fish from sliding towards the fishhook tip after capture.

These together with additional objects, features and advantages of the barbless safety fishhook will be readily apparent to those of ordinary skill in the art upon reading the following detailed description of the presently preferred, but nonetheless illustrative, embodiments when taken in conjunction with the accompanying drawings.

In this respect, before explaining the current embodiments of the barbless safety fishhook in detail, it is to be understood that the barbless safety fishhook is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the barbless safety fishhook.

It is therefore important that the claims be regarded as including such equivalent construction insofar as they do not depart from the spirit and scope of the barbless safety fishhook. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 1 is a perspective view of an embodiment of the disclosure.

FIG. 2 is a front view of an embodiment of the disclosure.

FIG. 3 is a side view of an embodiment of the disclosure.

FIG. 4 is a cross-sectional view of an embodiment of the disclosure across line 4-4 in FIG. 3.

DETAILED DESCRIPTION OF THE EMBODIMENT

Figure 5:
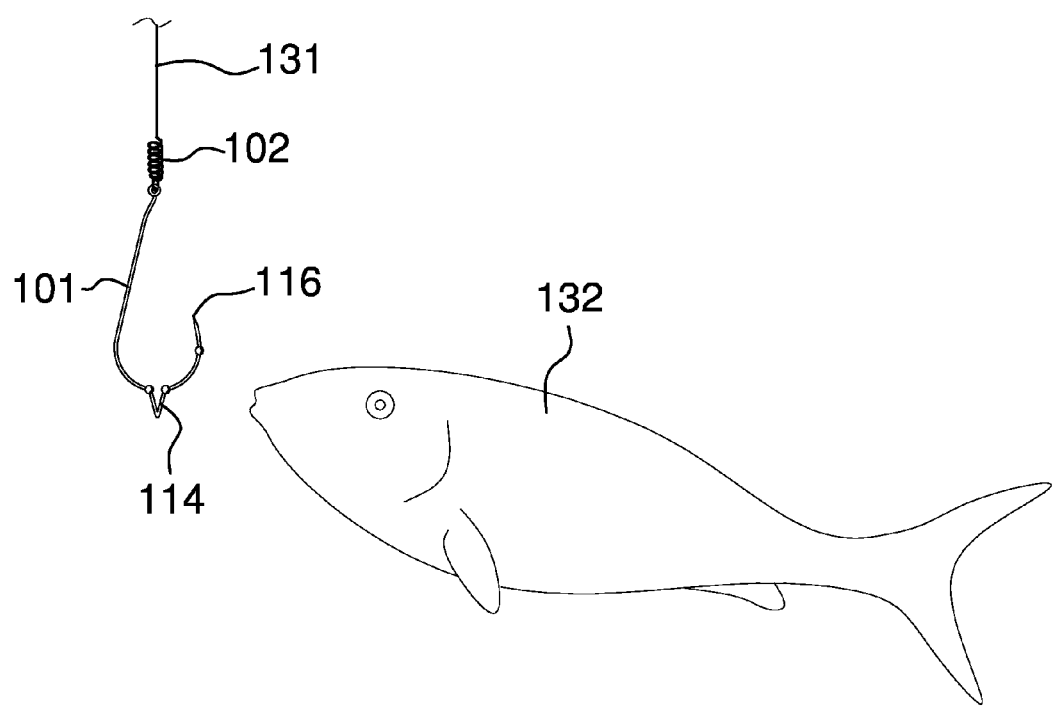
FIG. 5 is an in use view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5. The barbless safety fishhook 100 (hereinafter invention) comprises a hook 101 and a spring lock 102.

The spring lock 102 comprises a helical spring that is used to connect the hook 101 to the fishing line 131. The purpose of the spring lock 102 is to reduce tension variations in the fishing line 131 while the fish 132 is being reeled in. The invention 100 will secure the fish 132 more efficiently and effectively when tension variations are reduced.

The hook 101 further comprises an eye 111, a shank 112, a bend 113, a V Notch 114, a bite 115, a tip 116, a plurality of rubber brakes 117, and a gap 118. The hook 101 is further defined with a first end 141 and a second end 142. The eye 111 is located at the first end 141 and the tip 116 is located at the second end 142.

The eye 111 is a loop that is formed in the first end 141 of the hook 101. The purpose of the eye 111 is to provide a location where the fishing line 131 can be attached to the hook 101. As discussed elsewhere in this disclosure, the eye 111 is attached to the fishing line 131 using the spring lock 102. The shank 112 is the segment of the hook 101 that projects away from the eye 111. The shank 112 ends at the point of the shank 112 where the distance between the shank 112 and the tip 116 is at a minimum. The span between where the shank 112 ends and the tip 116 is called the gap 118. The shank 112 is further defined with a third end 143, which is the end of the shank 112 distal from the first end 141.

The third end 143 of the shank 112 is attached to the bend 113. The bend 113 is the segment of the hook 101 that forms the characteristic J shape of a fishhook. The bend 113 curves the fishhook through approximately 180 degrees so that the tip 116 points in the direction of the fishing line 131. The bend 113 is further defined with a fourth end 144 and a fifth end 145. The fourth end 144 of the bend 113 is attached to the third end 143 of the shank 112. The fifth end 145 of the bend 113 is the end that is distal from the fourth end 144. The V Notch 114 is formed in the bend 113 at the point of the bend 113 where the distance between the eye 111 and the bend 113 is at a maximum. The V Notch 114 is a V shaped structure that is formed as a part of the bend 113.

The purpose of the V Notch 114 is to secure the fish 132 after it has been caught on the hook 101. By applying tension to the fishing line 131, the tension pulls the tip 116 of the hook 101 deeper into the fish 132. However, the hook 101 is still at risk of being thrown should the fish 132 exhibit erratic movement. However, once the hook 101 is deep enough into the fish 132 so that the flesh of the fish 132 is captured by the V Notch 114, the V Notch 114 applies additional gripping forces from multiple directions on the flesh of the fish 132 holding the fish 132 more securely on the hook 101 and preventing the hook 101 from sliding in the reverse direction of travel to release the fish 132. The fifth end 145 of the bend 113 is located where: 1) the slope of the bend 113 is parallel to the slope of the shank 112; and, 2) the V Notch 114 is positioned between fifth end 145 of the bend 113 and the shank 112.

The plurality of rubber brakes 117 is positioned on the bend 113. The purpose of the plurality of rubber brakes 117 is to secure the fish 132 on the hook 101 by preventing the fish 132 from sliding backwards on the hook 101. Each of the plurality of rubber brakes 117 is a small rubber sphere. In the first potential embodiment of the disclosure, the invention 100 is provisioned with a seventh rubber brake 147, an eighth rubber brake 148 and a ninth rubber brake 149. The ninth rubber brake 149 is positioned where the fifth end 145 and the sixth end 146 are joined. The seventh rubber brake 147 and the eighth rubber brake 148 are each positioned at a point where the V Notch 114 and the bend 113 are joined. The seventh rubber brake 147 is positioned at the junction of the V Notch 114 and the bend 113 that is closest to the fourth end 144. The eighth rubber brake 148 is positioned at the junction of the V Notch 114 and the bend 113 that is closest to the fifth end 145.

The bite 115 of the hook 101 is a shaft that is further defined by a sixth end 146 and the tip 116. The sixth end 146 of the bite 115 is attached to the fifth end 145 of the bend 113. The end of the bite 115 that is distal from the sixth end 146 of the bite 115 is the tip 116. The tip 116 is the point of the hook 101 that penetrates the flesh of the fish 132. The tip 116 acts as a needle point hook 101 and is surgically sharpened to provide for faster, deeper, and cleaner penetration into the flesh of the fish 132.

The invention 100 can be readily adapted for use on a vast array of commonly used lures and baits including, but not limited to: spinner bait, swim bait, buzz bait, soft plastic bait, jigs, spoons and live bait. The invention 100 can be readily adapted to perform on a vast array of commonly used fishhook sizes including, but not limited to, 16, 14, 12, 10, 8, 6, 5, 4, 3, 2, 1, 1/0, 2/0, 3/0, 4/0, 5/0, 6/0, 7/0, 8/0, and 9/0. The invention 100 can be readily adapted to perform on a vast array of commonly used fishhook designs including single fishhooks, double fishhooks, and treble fishhooks. The invention 100 can be readily adapted to perform with fishhooks designed for salt water use or fresh water use.

No special skill is required to use the invention 100. The invention 100 can be used in the same way that current fishhooks are used. After the fish 132 is captured, the fish 132 can be removed by pulling the flesh of the fish 132 out of the V Notch 114 and the pulling the invention 100 out of the flesh of the fish 132 using the same path that the hook 101 entered the fish 132 through.

Methods to manufacture the invention 100 are well known and documented in the art and can be easily accomplished by a company that meets minimal industrial standards for metal working, metal molding and metal fabrication.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A fishhook comprising:
a hook and a spring lock;
wherein the hook further comprises a V Notch;
wherein the fishhook does not have a barb;
wherein the spring lock comprises a helical spring;
wherein the spring lock attaches the hook to a fishing line;
wherein the hook further comprises an eye, a shank, a bend, a bite, a tip, and a plurality of rubber brakes;
wherein the hook is further defined with a first end and a second end;
wherein the eye is located at the first end of the hook;
wherein the tip is located at the second end of the hook;
wherein the eye is a loop that is formed at the first end of the hook;
wherein the shank is a segment of the hook that projects away from the eye;
wherein the shank is further defined with a third end;
wherein the third end of the shank is attached to the bend;
wherein the bend is further defined with a fourth end and a fifth end;
wherein the fourth end of the bend is attached to the third end of the shank;
wherein the V Notch is formed in the bend at a point of the bend where a distance between the eye and the bend is at a maximum;
wherein the V Notch is a V shaped structure that is formed as a part of the bend;
wherein the V Notch applies gripping forces from multiple directions on a flesh of a fish;
wherein the plurality of rubber brakes are positioned on the bend;
wherein each of the plurality of rubber brakes is a rubber sphere.

2. The fishhook according to claim 1 wherein the plurality of rubber brakes further comprises a seventh rubber brake, an eighth rubber brake, and a ninth rubber brake.

3. The fishhook according to claim 2 wherein the tip acts as a needle point hook and is surgically sharpened.

4. The fishhook according to claim 3 wherein the hook is adapted to be used with a bait or lure type selected from a group consisting of spinner bait, swim bait, buzz bait, soft plastic bait, jigs, spoons or live bait.

* * * * *